United States Patent Office 3,017,383
Patented Jan. 16, 1962

1

3,017,383
POLY-α-OLEFINS CONTAINING HYDROXY-
BENZOPHENONE DERIVATIVES
Gerald R. Lappin, Kingsport, Tenn., assignor to Eastman Kodak Company, Rochester, N.Y., a corporation of New Jersey
No Drawing. Filed Dec. 3, 1959, Ser. No. 856,941
10 Claims. (Cl. 260—45.85)

This invention relates to the stabilization of poly-α-olefin compositions, and more particularly, to the stabilization of poly-α-olefin compositions against deterioration resulting from exposure to sunlight or ultraviolet light.

Poly-α-olefins are subject to deterioration when exposed to ultraviolet light. A number of so-called ultraviolet inhibitors are known which are used to inhibit the deterioration or degradation of many plastic or resin materials. However, some of the most effective of these known ultraviolet inhibitors for such plastic materials as cellulose triacetate, polystyrene, polyvinyl chloride and the like are not compatible with such poly-α-olefins as polyethylene. Typical of such ultraviolet inhibitors are 2,4 - dihydroxybenzophenone and 2,2' - dihydroxy-4,4'-dimethoxybenzophenone. Also, there are other common ultraviolet inhibitors that are compatible with, but are not entirely satisfactory or are only mediocre stabilizers for, poly-α-olefins. In addition, many effective stabilizers for halogen-containing polymers such as polyvinyl chloride, polyvinylidene chloride, and the like are not necessarily effective stabilizers in poly-α-olefins, as stabilizers in halogen-containing polymers function essentially as halide scavengers while stabilizers in poly-α-olefins do not serve this function. Hence, it is highly unpredictable as to whether a given stabilizer or ultraviolet inhibitor will be compatible with, and a good stabilizer for, poly-α-olefin compositions short of actually testing the material in poly-α-olefins.

It is an object of this invention to provide new poly-α-olefin compositions of high stability against deterioration resulting from exposure to sunlight or ultraviolet light.

It is likewise an object of this invention to provide novel poly-α-olefin compositions such as polyethylene and polypropylene containing hydroxybenzophenone derivatives as ultraviolet inhibitors that have good compatibility therewith.

It is also an object of this invention to provide novel polyethylene compositions containing additives that are soluble in, and effective ultraviolet inhibitors for, the polyethylene compositions.

Other objects of the invention will be apparent from the description and claims which follow.

The present invention comprises poly-α-olefin compositions of improved resistance to deterioration due to ultraviolet light having incorporated therein a stabilizing amount of 2-hydroxy-4,4'-diacyloxybenzophenone having the following structural formula:

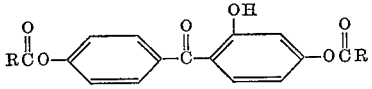

wherein R is an alkyl radical having 4 to 18 carbon atoms and preferably 11 to 13 carbon atoms.

The subject ultraviolet inhibitors can be used to stabilize a wide variety of solid poly-α-olefin compositions against deterioration resulting from exposure to ultraviolet light. Any of the normally solid polymers of α-monoolefinic aliphatic hydrocarbons containing 2 to 10 carbon atoms can be stabilized in accordance with the invention. The subject stabilizers are preferably used in polyethylene and polypropylene, although such poly-α-olefins as poly(4-methylpentene-1), poly(3-methylbutene-1), poly-(pentene - 1), poly(3,3 - dimethylbutene-1), poly(4,4-di-

2 methylbutene-1), poly(octene-1), poly(decene-1), and the like are included in the invention. Both the so-called "low density" and "high density" poly-α-olefin compositions can be stabilized in accordance with the invention. Reference is made to Fawcett et al. U.S. Patent No. 2,153,553, granted April 11, 1939, and to copending applications, Coover, U.S. Serial No. 559,536, filed January 17, 1956, now abandoned, and Coover et al., U.S. Serial No. 724,904, filed March 31, 1958, now abandoned, with regard to the preparation of various types of poly-α-olefins. The subject stabilizers can be used as ultraviolet inhibitors for the solid plastic or resinous poly-α-olefin compositions usually having average molecular weights of at least 15,000 and more usually at least 20,000. The subject inhibitors are of particular utility in thin films or sheets of poly-α-olefin compositions about .5 to 100 mils in thickness.

The amount of the subject 2-hydroxy-4,4'-diacyloxybenzophenone employed in poly-α-olefin compositions can be widely varied, the stabilizing amount usually varying with the particular use to which the poly-α-olefin composition is to be put. Concentrations of .01% to 10% are more generally used, with concentrations of .1% to 5% and often times .5% to 2.5% being preferably employed, the concentrations being based on the weight of the poly-α-olefin.

The ultraviolet inhibitors of the invention can be incorporated or blended into poly-α-olefin compositions by any of the conventional methods used for blending such materials into resins or plastics. Typical of such methods that can be suitably employed include milling on heated rolls, deposition from solvents and dry-blending.

The ultraviolet inhibitors of the present invention lend to poly-α-olefin compositions improved stability, and more specifically, improved stability against deterioration resulting from exposure to sunlight or ultraviolet light. Also, the subject inhibitors do not impart objectionable discoloration to poly-α-olefin compositions. Thus, poly-α-olefin compositions stabilized in accordance with the invention can be utilized for a wide diversity of applications. The stabilizers of the invention, apart from being effective stabilizers against deterioration resulting from exposure to ultraviolet light, have compatibility with poly-α-olefin compositions. While the subject derivatives of 2,4,4'-trihydroxybenzophenone have good compatibility with polyethylene compositions, such closely-related compounds as 2,4-dihydroxybenzophenone and 2,2'-dihydroxy-4,4'-dimethoxybenzophenone are not compatible with polyethylene compositions and exude in substantial amounts from polyethylene after being compounded therein.

The effectiveness of the subject stabilizers against photodegradation or ultraviolet light deterioration in poly-α-olefins is illustrated by the following examples.

EXAMPLE 1

Several 2-hydroxy-4,4'-diacyloxybenzophenones of the invention were incorporated into plastic grade solid polyethylene having an average molecular weight greater than 15,000, a melt index of 2 and a density of 0.918 at a level of 1% by weight based on the polyethylene by milling on heated rolls in accordance with usual practice and formed into sheets 60 mils in thickness. The resulting samples were then exposed for one year to outdoor weathering on a rack facing south at an angle with the horizontal of 36.5° at Kingsport, Tennessee. After the one year exposure time, the various polyethylene samples were evaluated with respect to percent of retention of their original tensile strength. The results of the exposure test are summarized by the data set out in Table A below. In Table A, the various 2-hydroxy-4,4'-diacyloxybenzophenone additives are represented by their respective "R" substituents in the following formula:

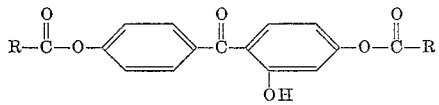

Table A

| Additive (R) | Percent Retention of Tensile Strength After One Year of Exposure |
|---|---|
| None | 10 |
| n-amyl ($C_5H_{11}$—) | 78 |
| n-heptyl ($C_7H_{15}$—) | 86 |
| n-nonyl ($C_9H_{19}$—) | 79 |
| n-undecyl ($C_{11}H_{23}$—) | 88 |
| n-tridecyl ($C_{13}H_{27}$—) | 82 |
| n-pentadecyl ($C_{15}H_{31}$—) | 78 |
| n-heptadecyl ($C_{17}H_{35}$—) | 75 |

As can be observed from the data set out in Table A, the additives of the invention substantially improved the stability of the polyethylene. Good compatibility with the polyethylene was shown by the various 2-hydroxy-4,4'-diacyloxybenzophenone additives during the weathering.

EXAMPLE 2

The effectiveness of several 2-hydroxy-4,4'-diacyloxybenzophenones of the invention as stabilizers for polypropylene was tested at a concentration of 1% based on the weight of the polypropylene. The additives were incorporated into the polypropylene and formed into films 2 mils in thickness by casting from a dope of polypropylene in tetralin. The polypropylene was a plastic grade solid polypropylene having an average molecular weight greater than 15,000, an inherent viscosity of 1.5 as determined in tetralin at 145° C. and a density of 0.915. Samples of films containing the various additives were exposed to outdoor weathering as described in Example 1 until the respective samples failed as indicated by their breaking on being creased by hand. The results are tabulated in Table B below in terms of "improvement factor" which is defined as the ratio of the life of the test film of polypropylene containing the additive to that of the test film of polypropylene containing no stabilizer additive. In Table B, the various 2-hydroxy-4,4'-diacyloxybenzophenone additives are represented by their respective "R" substituents in the formula set out in Example 1.

Table B

| Additive (R) | Improvement Factor |
|---|---|
| n-amyl ($C_5H_{11}$—) | 8 |
| n-heptyl ($C_7H_{15}$—) | 10 |
| n-nonyl ($C_9H_{19}$—) | 10 |
| n-undecyl ($C_{11}H_{23}$—) | 12 |
| n-tridecyl ($C_{13}H_{27}$—) | 12 |
| n-pentadecyl ($C_{15}H_{31}$—) | 10 |
| n-heptadecyl ($C_{17}H_{35}$—) | 10 |

As illustrated by the data in Table B, the present 2-hydroxy-4,4'-diacyloxybenzophenones lend to polypropylene substantial protection against degradation resulting from exposure to the elements, and particularly to sun light or ultraviolet light.

The stabilizer additives of the invention were prepared by reacting two molar equivalents of a fatty acid with one molar equivalent of 2,4,4'-trihydroxybenzophenone in the presence of phosphorus oxychloride. Although 2,4,4'-trihydroxybenzophenone contains three hydroxyl groups, only the hydroxyl groups in the 4 and 4'-positions are selectively esterified. The 2,4,4'-trihydroxybenzophenone reactant can be prepared by the method disclosed in copending Newland, Tamblyn and Kibler application, U.S. Serial No. 709,460, filed January 17, 1958, now U.S. Patent No. 2,925,401.

EXAMPLE 3

A mixture of 12 g. (0.05 mole) of 2,4,4'-trihydroxybenzophenone, 20 g. (0.10 mole) of lauric acid and 5.1 g. (0.03 mole) of phosphorus oxychloride was heated at 120°–130° C. for 90 minutes. The resulting reaction mixture was poured into water, and the product extracted with diethyl ether. The diethyl ether was evaporated and the resulting residue recrystallized from methanol to yield 22 g. of 2-hydroxy-4,4'-di-n-dodecanoyloxybenzophenone. In the same manner other 2-hydroxy-4,4'-diacyloxybenzophenones were prepared by substituting n-hexanoic acid, n-octanoic acid, n-decanoic acid, myristic acid, cetyl acid and stearic acid respectively for the lauric acid. The properties of the various 2-hydroxy-4,4'-diacyloxybenzophenones are summarized by the data set out in Table C below wherein the various 2-hydroxy-4,4'-diacyloxybenzophenones are represented by their respective "R" substituents in the formula set out in Example 1.

Table C

| R | M.P., °C. | Analysis | | | |
|---|---|---|---|---|---|
| | | Calc. | | Found | |
| | | C | H | C | H |
| n-amyl ($C_5H_{11}$–) | Oil | 52.8 | 5.28 | 52.3 | 5.02 |
| n-heptyl ($C_7H_{15}$–) | Oil | 55.8 | 6.09 | 56.4 | 5.82 |
| n-nonyl ($C_9H_{19}$–) | 32–35 | 58.1 | 6.77 | 58.5 | 7.04 |
| n-undecyl ($C_{11}H_{23}$–) | 48–50 | 60.1 | 7.33 | 60.5 | 7.28 |
| n-tridecyl ($C_{13}H_{27}$–) | 52–56 | 62.1 | 7.33 | 59.8 | 7.69 |
| n-pentadecyl ($C_{15}H_{31}$–) | 54–57 | 63.8 | 8.26 | 63.9 | 8.47 |
| n-heptadecyl ($C_{17}H_{35}$–) | 61–63 | 65.0 | 8.68 | 64.8 | 8.53 |

EXAMPLE 4

The 2,4,4'-trihydroxybenzophenone derivatives of the invention have good compatibility with polyethylene which compatibility many closely related compounds do not possess. Several hydroxybenzophenones were incorporated into polyethylene at a level of 1% by weight based on the polyethylene by milling on heated rolls in accordance with usual practice and formed into sheets 60 mils in thickness and exposed to outdoor weathering as described in Example 1. The surfaces of the respective samples were examined for possible exudation of the additive.

Table D

| Additive | Amount of Exuded Additive |
|---|---|
| 2-Hydroxy-4,4'-n-dodecanoyloxybenzophenone [1] | None. |
| 2-Hydroxy-4,4'-n-tetradecanoyloxybenzophenone [1] | Do. |
| 2,4-Dihydroxybenzophenone | Much. |
| 2,2'-Dihydroxy-4,4'-dimethoxybenzophenone | Do. |
| 2,4-Dihydroxy-5-n-hexylbenzophenone | Do. |
| 2-Hydroxy-4,4'-dimethoxybenzophenone | Do. |
| 2,4-Dihydroxy-5-n-dodecyloxybenzophenone | Do. |

[1] Stabilizers of the invention.

As can be observed from the information set out in Table D, the present 2-hydroxy-4,4'-acyloxybenzophenones have good compatibility in polyethylene, which compatibility other closely related hydroxybenzophenones and hydroxybenzophenone derivatives do not possess.

Although the invention has been described in considerable detail with reference to certain preferred embodiments thereof, it will be understood that variations and modifications can be effected within the spirit and scope of the invention as described hereinabove and as defined in the appended claims.

I claim:

1. A solid poly-α-olefin composition comprising a solid poly-α-olefin prepared from an α-monoolefinic aliphatic hydrocarbon having 2 to 6 carbon atoms and about .01% to 10% by weight based on said poly-α-olefin of a 2-hydroxy-4,4'-diacyloxybenzophenone having the formula:

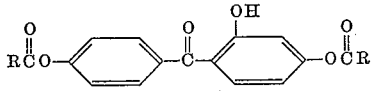

wherein R is an alkyl radical having 4 to 18 carbon atoms.

2. A solid poly-α-olefin composition comprising a solid poly-α-olefin selected from the group consisting of polyethylene and polypropylene and about .01% to 10% by weight based on said poly-α-olefin of a 2-hydroxy-4,4'-diacyloxybenzophenone having the formula:

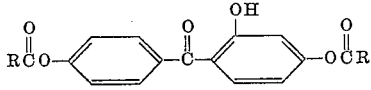

wherein R is an alkyl radical having 4 to 18 carbon atoms.

3. A solid poly-α-olefin composition comprising a solid polyethylene and about .01% to 10% by weight based on said polyethylene of a 2-hydroxy-4,4'-diacyloxybenzophenone having the formula:

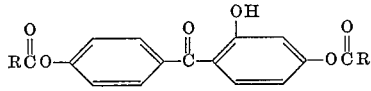

wherein R is an alkyl radical having 4 to 18 carbon atoms.

4. A solid poly-α-olefin composition comprising solid polypropylene and about .01% to 10% by weight based on said polypropylene of a 2-hydroxy-4,4'-diacyloxybenzophenone having the formula:

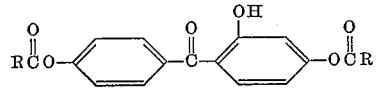

wherein R is an alkyl radical having 4 to 18 carbon atoms.

5. A solid poly-α-olefin composition in a film .5 to 100 mils in thickness comprising a solid poly-α-olefin selected from the group consisting of polyethylene and polypropylene and about .5% to 2.5% by weight based on said poly-α-olefin of a 2-hydroxy-4,4'-diacyloxybenzophenone having the formula:

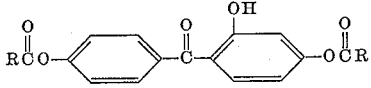

wherein R is an alkyl radical having 4 to 18 carbon atoms.

6. A solid poly-α-olefin composition as defined by claim 2 wherein the 2-hydroxy-4,4'-diacyloxybenzophenone is 2-hydroxy-4,4'-n-hexanoyloxybenzophenone.

7. A solid poly-α-olefin composition as defined by claim 2 wherein the 2-hydroxy-4,4'-diacyloxybenzophenone is 2-hydroxy-4,4'-n-octanoyloxybenzophenone.

8. A solid poly-α-olefin composition as defined by claim 2 wherein the 2-hydroxy-4,4'-diacyloxybenzophenone is 2-hydroxy-4,4'-n-decanoyloxybenzophenone.

9. A solid poly-α-olefin composition as defined by claim 2 wherein the 2-hydroxy-4,4'-diacyloxybenzophenone is 2 - hydroxy - 4,4'-n-dodecanoyloxybenzophenone.

10. A solid poly-α-olefin composition as defined by claim 2 wherein the 2-hydroxy-4,4'-diacyloxybenzophenone is 2 - hydroxy - 4,4'-n-tetradecanoyloxybenzophenone.

References Cited in the file of this patent

UNITED STATES PATENTS

| | | |
|---|---|---|
| 2,682,559 | Stanley et al. | June 29, 1954 |
| 2,686,812 | Wynn et al. | Aug. 17, 1954 |
| 2,891,996 | Clark et al. | June 23, 1959 |